(12) United States Patent
Gambatese et al.

(10) Patent No.: US 7,823,963 B2
(45) Date of Patent: Nov. 2, 2010

(54) VEHICLE REAR WINDOW BODY STRUCTURE

(75) Inventors: Brady J. Gambatese, Ann Arbor, MI (US); Masanori Izumoto, Tokyo (JP); Osamu Yamada, Tokyo (JP)

(73) Assignees: Toyota Motor Corporation, Toyota (JP); Toyota Motor Engineering & Manufacturing North America, Inc., Erlanger, KY (US)

( * ) Notice: Subject to any disclaimer, the term of this patent is extended or adjusted under 35 U.S.C. 154(b) by 284 days.

(21) Appl. No.: 11/668,175

(22) Filed: Jan. 29, 2007

(65) Prior Publication Data
US 2007/0252410 A1 Nov. 1, 2007

Related U.S. Application Data

(60) Provisional application No. 60/765,942, filed on Feb. 7, 2006.

(51) Int. Cl.
*B62D 25/08* (2006.01)
(52) U.S. Cl. .............................. 296/203.04; 296/146.15; 296/146.16
(58) Field of Classification Search ............ 296/187.01, 296/146.9, 201, 203.01, 203.04, 145.15, 296/146.16, 193.08; 49/502, 441, 479.1
See application file for complete search history.

(56) References Cited

U.S. PATENT DOCUMENTS

| | | | |
|---|---|---|---|
| 4,119,341 A * | 10/1978 | Cook ..................... | 296/146.16 |
| 4,187,642 A | 2/1980 | Morinaga et al. | |
| 4,243,262 A | 1/1981 | Tokunaga et al. | |
| 4,470,717 A | 9/1984 | Bruhnke et al. | |
| 4,492,405 A | 1/1985 | Chikaraishi et al. | |
| 4,598,008 A | 7/1986 | Vogt et al. | |
| 4,640,066 A | 2/1987 | Hayashi et al. | |
| 5,051,020 A | 9/1991 | Schleicher | |
| 5,209,546 A | 5/1993 | Hasegawa et al. | |
| 5,451,090 A | 9/1995 | Brodie et al. | |
| 5,467,560 A * | 11/1995 | Camp et al. ................... | 49/413 |
| 5,544,458 A | 8/1996 | Fisher et al. | |
| 5,586,799 A * | 12/1996 | Kanemitsu et al. ..... | 296/203.02 |

(Continued)

FOREIGN PATENT DOCUMENTS

JP 01103552 4/1989

(Continued)

*Primary Examiner*—Patricia L Engle
*Assistant Examiner*—SunSurraye Westbrook
(74) *Attorney, Agent, or Firm*—Gifford, Krass, Sprinkle, Anderson & Citkowski, P.C.

(57) ABSTRACT

A body structure for an automotive vehicle includes a side member, an outer back panel and an inner back panel. The side member extends generally vertically and defines a rear pillar of the vehicle. The side member has an inner flange. The outer back panel has a middle wall extending generally transversely in the vehicle. The outer back panel has a connecting wall extending from the middle wall. The inner back panel has a center wall extending generally transversely in the vehicle. The inner back panel has a connecting flange extending from the center wall. The inner back panel is spaced apart from the outer back panel to define a cavity in which a rear window is disposed. The connecting flange, connecting wall and inner flange are fixedly secured to each other to define a longitudinally extending seal that prevents liquid from passing between the cavity and an inside region of the vehicle.

6 Claims, 4 Drawing Sheets

U.S. PATENT DOCUMENTS

| | | | |
|---|---|---|---|
| 6,010,182 A | 1/2000 | Townsend | |
| 6,572,176 B2 * | 6/2003 | Davis et al. | 296/146.16 |
| 6,582,012 B1 | 6/2003 | Smith | |
| 6,695,394 B2 | 2/2004 | Takahashi | |
| 6,802,557 B2 * | 10/2004 | Hoshina | 296/201 |
| 6,863,338 B2 | 3/2005 | Stahl et al. | |
| 6,997,505 B2 | 2/2006 | Dry et al. | |
| 7,025,405 B2 * | 4/2006 | Gillen | 296/146.16 |
| 7,083,220 B2 * | 8/2006 | Suzuki | 296/146.16 |
| 2001/0032422 A1 * | 10/2001 | Farrar | 52/204.5 |
| 2003/0132646 A1 | 7/2003 | Hoshina | |
| 2004/0145214 A1 * | 7/2004 | Farrar et al. | 296/146.15 |
| 2005/0081451 A1 | 4/2005 | Tamura et al. | |
| 2005/0140158 A1 | 6/2005 | Ogawa et al. | |
| 2005/0200159 A1 | 9/2005 | Eckhart et al. | |
| 2005/0241253 A1 | 11/2005 | Song et al. | |
| 2006/0001290 A1 | 1/2006 | Hammaker et al. | |
| 2006/0043774 A1 | 3/2006 | McNulty et al. | |
| 2006/0150523 A1 | 7/2006 | Matthies | |

FOREIGN PATENT DOCUMENTS

| | | |
|---|---|---|
| JP | 2004203132 | 7/2004 |

* cited by examiner

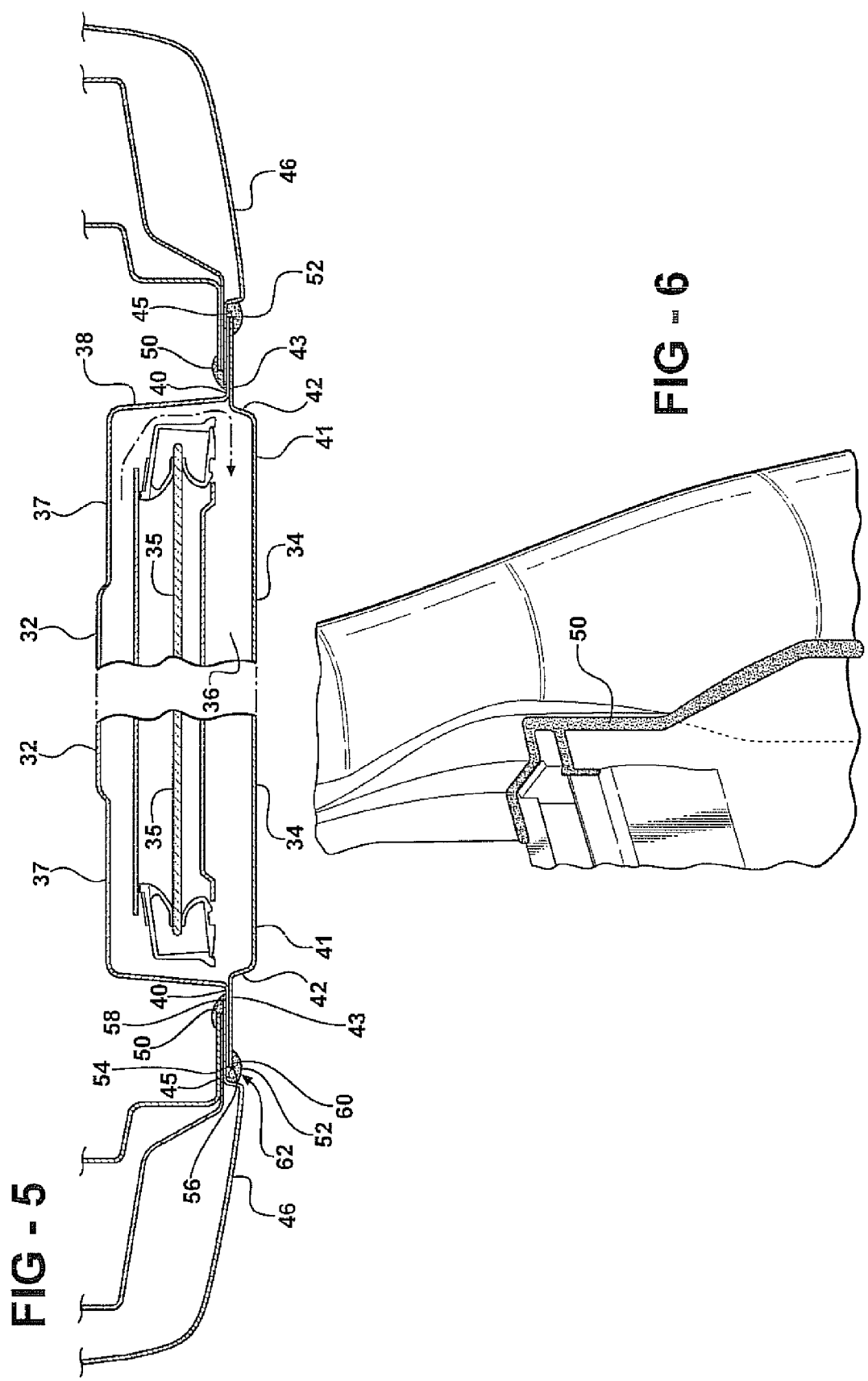

VEHICLE REAR WINDOW BODY STRUCTURE

CROSS REFERENCE TO RELATED APPLICATION

This application claims priority to U.S. provisional patent application Ser. No. 60/765,942, which was filed Feb. 7, 2006 and is incorporated herein by reference in its entirety.

BACKGROUND OF THE INVENTION

1. Field of the Invention

The invention relates to an improved body structure for an automotive vehicle. More particularly, the invention relates to a body structure that supports a rear window in a cavity and prevents liquid from passing between the cavity and an inner area of the vehicle.

2. Description of the Related Art

Most pickup trucks include an openable and closeable rear window. Some pickup trucks include a power actuated rear window, wherein the rear window when actuated moves in an up and down direction. As best shown in FIG. 1, the window 5 is typically slidably mounted between an inner back panel 10 and outer back panel 12. Both the inner back panel 10 and outer back panel 12 were, in turn, secured to a pillar bracket 14 and side panel member 16 by tack welding.

One disadvantage of this previously known construction is that water leakage from outside of the window 5 would flow in between the inner 10 and outer 12 back panels. This water, in turn, would flow past the pillar bracket 14 and side member 16 and into the vehicle. This water leakage flow is indicated by the dotted line 18 in FIGS. 2 and 3.

In order to eliminate or at least reduce this water leakage, the previously known constructions have utilized a urethane seal 20 in between the pillar bracket 14, side member 16 and outer back panel 12. These seals 20, however, have not proven wholly satisfactory in operation.

SUMMARY OF THE INVENTION

According to one aspect of the invention, a body structure is provided for an automotive vehicle. The body structure includes a side member, an outer back panel and an inner back panel. The side member extends generally vertically and defines a rear pillar of the vehicle. The side member has an inner flange. The outer back panel has a middle wall extending generally transversely in the vehicle. The outer back panel has a connecting wall extending from the middle wall. The inner back panel has a center wall extending generally transversely in the vehicle. The inner back panel has a connecting flange extending from the center wall. The inner back panel is spaced apart from the outer back panel to define a cavity in which a rear window is disposed. The connecting flange, connecting wall and inner flange are fixedly secured to each other to define a longitudinally extending seal that prevents liquid from passing between the cavity and an inside region of the vehicle.

According to another aspect of the invention, a body structure is provided for an automotive vehicle. The body structure includes a side member, an outer back panel and an inner back panel. The side member extends generally vertically and defines a rear pillar of the vehicle. The side member has an inner flange. The outer back panel has a middle wall extending generally transversely in the vehicle. The outer back panel has a connecting wall extending from the middle wall. The inner back panel has a center wall extending generally transversely in the vehicle. The inner back panel has a connecting flange extending from the center wall. The inner back panel is spaced apart from the outer back panel to define a cavity in which a rear window is disposed. The connecting flange, connecting wall and inner flange are overlapped to define a longitudinally extending seal that prevents liquid from passing between the cavity and an inside region of the vehicle. The connecting wall and inner flange are welded to respective opposite sides of the connecting flange.

BRIEF DESCRIPTION OF THE DRAWINGS

Advantages of the present invention will be readily appreciated as the same becomes better understood by reference to the following detailed description when considered in connection with the accompanying drawing, wherein:

FIG. 5 is a cross sectional view of the structure of FIG. 4; and

FIG. 6 is a partial perspective view of the structure of FIG. 4.

DESCRIPTION OF THE INVENTION

Figure 1:
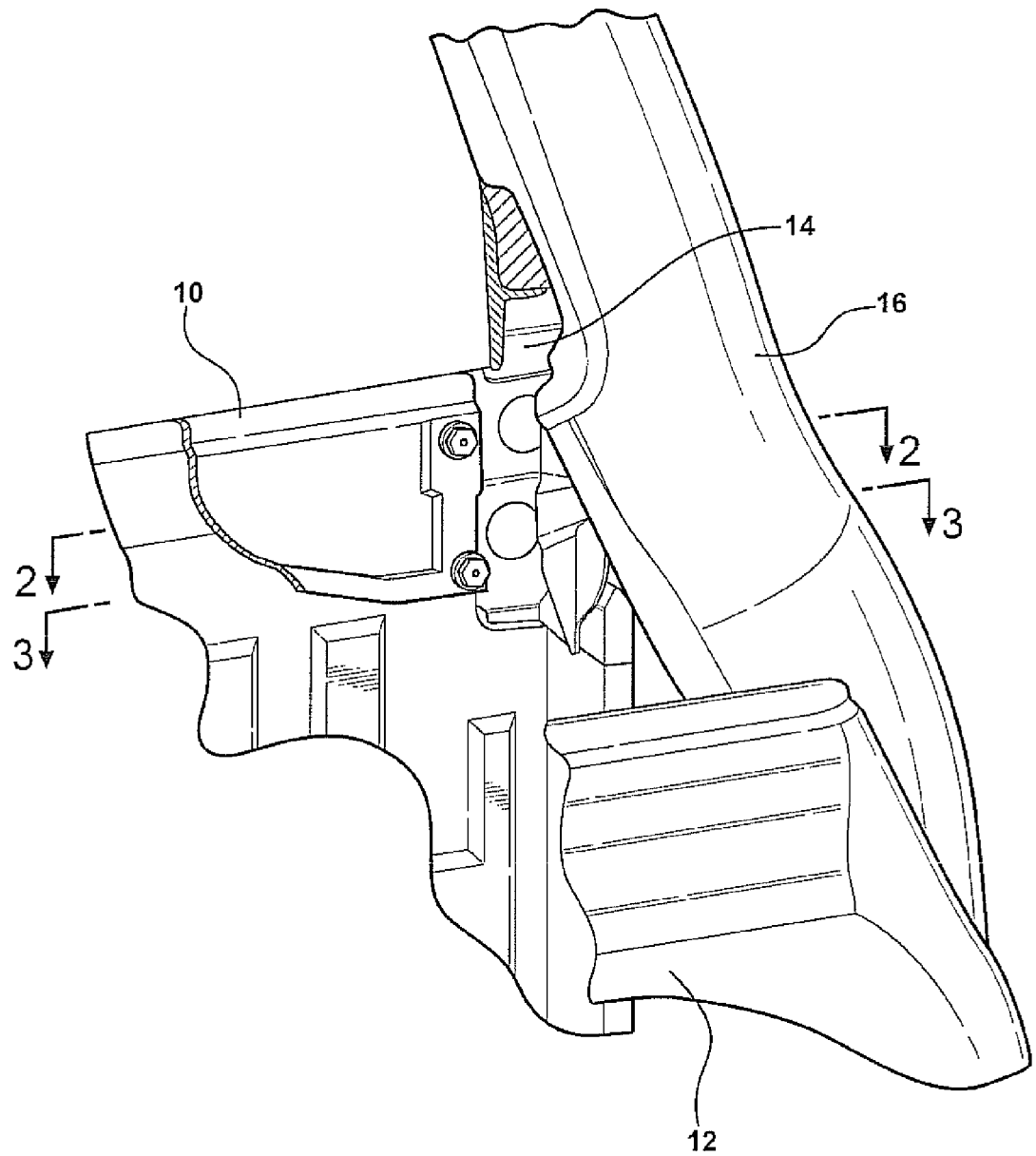
FIG. 1 is a fragmentary exploded view illustrating a prior art body structure for a pickup truck having a power rear window.
Figure 2:
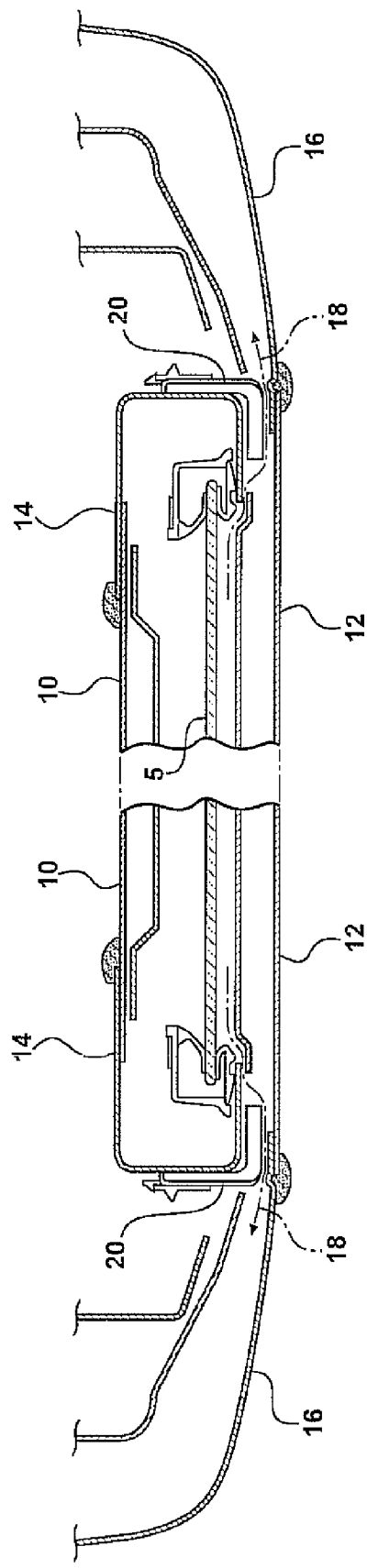
FIG. 2 is a cross-sectional view of the structure of FIG. 1.
Figure 3:
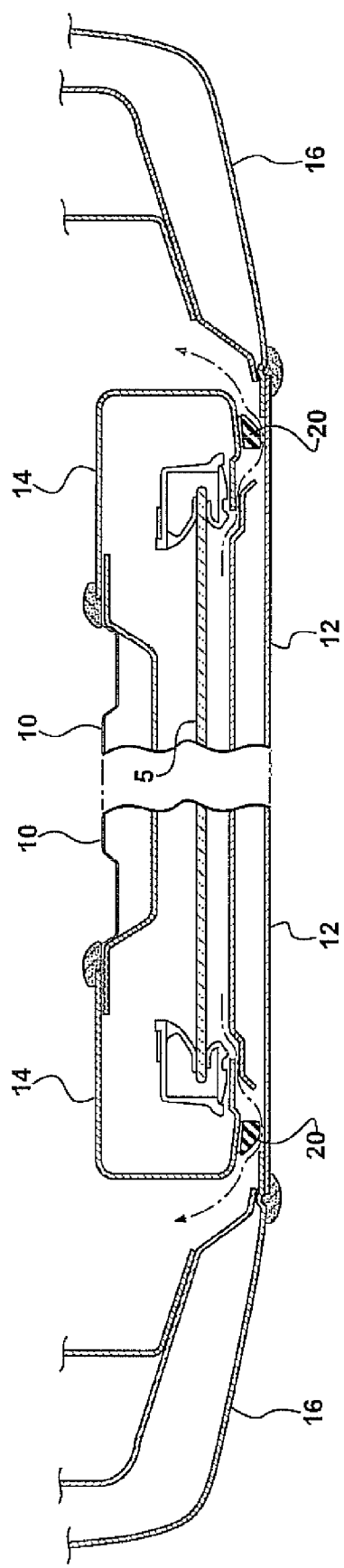
FIG. 3 is a cross-sectional view of the structure of FIG. 1.
Figure 4:
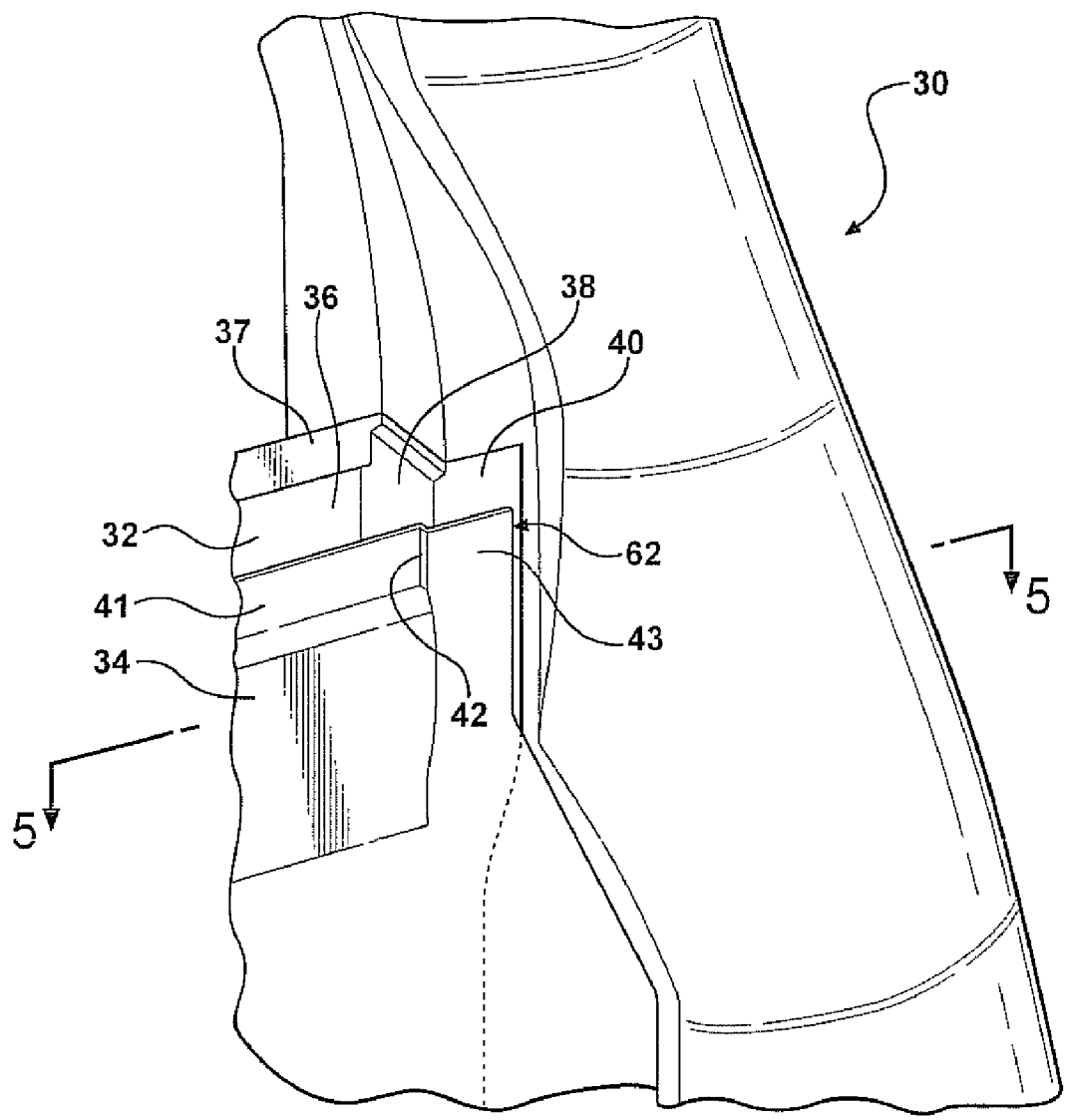
FIG. 4 is a partial perspective view of a vehicle body structure for a pickup according to an embodiment of the present invention.

Referring to FIGS. 4-6, a portion of a vehicle body structure 30 according to the invention is shown. Illustratively, the body structure shown is for a pickup truck. The body structure 30 is substantially symmetrically opposite about a fore-aft extending center line of the pickup. Thus, only one side of the body structure 30 is described below. The body structure 30 includes an inner back panel 32 and an outer back panel 34 that are spaced apart from each other. The spacing between the inner back panel 32 and outer back panel 34 defines a window cavity 36. The rear window 35 is disposed in the window cavity 36.

The inner back panel 32 includes a center wall 37 and a side portion 38. The center wall 37 is generally parallel with the rear window 35. The side portion 38 is integral with and generally orthogonal relative to the center wall 37. The side portion 38 extends along a side edge of the rear window 35. The inner back panel 32 also includes an integral connecting flange 40 that extends outwardly and orthogonally from the side portion 38 and into a connecting flange edge 54.

The outer back panel 34 includes a middle wall 41 and a side edge 42. The side edge 42 is integral with and generally orthogonal relative to the middle wall 41. The side edge 42 extends along the side edge of the rear window 35. The outer back panel 34 also includes an integral connecting wall 43 that is generally parallel with and abuts the connecting flange 40 of the inner back panel. The connecting wall 43 extends towards the side member 46 and into a connecting wall edge 56.

The body structure 30 also includes a side member 46 that extends generally vertically and defines a rear quarter section or pillar of the vehicle's passenger cab. The side member 46 includes an inner flange 45 generally parallel with the connecting flange 40 and connecting wall 43. The inner flange 45 extends into a side member edge 58.

The connecting flange 40, connecting wall 43 and side member 46 are overlapped to form a stack. More specifically, the connecting flange edge 54 is joined to the connecting wall edge 56 so as to form a joined edge 60. The joined edge 60 extends generally vertically along the automotive vehicle. The joined edge 60 is fixed to the side member edge 58 so as to form a longitudinally extending seal 62. Thus, the connecting flange 40 is sandwiched between the connecting wall 43 and the inner flange 45. On one side of the stack, a weld 50 is made between the connecting flange 40 and an open edge of the inner flange 45. A second weld 52 may be provided on an opposite side of the stack between the inner flange 45 and an open edge of the connecting wall 43 to reinforce the first weld. Other suitable fixing methods known by those having ordinary skill in the art may be used, such as using metal bonding adhesives.

Since a continuous longitudinally extending seal 62 is formed between the inner back panel 32 and outer back panel 34 by the overlapping connecting flange 40 and connecting wall 43, water leakage from the window receiving cavity 36 into the interior of the vehicle is effectively prevented. Drainage holes may be formed in the bottom of the window cavity 36 in order to allow such water to escape from the window cavity 36.

The invention has been described in an illustrative manner. It is, therefore, to be understood that the terminology used is intended to be in the nature of words of description rather than of limitation. Many modifications and variations of the invention are possible in light of the above teachings. For example, the body structure described above may be suitable for other vehicles that are not necessarily pickup trucks, but have similar structure and/or function. Thus, within the scope of the appended claims, the invention may be practiced other than as specifically described.

We claim:

1. A body structure for an automotive vehicle, the body structure configured to house a window, the window operable to move along a vertical plane between a closed position and an open position, the body structure comprising:

a side member extending generally vertically and defining a rear pillar of the vehicle, the side member having an inner flange extending into a side member edge;

an outer back panel extending generally transversely in the vehicle, the outer back panel having a connecting wall extending toward the side member and into a connecting wall edge;

an inner back panel extending generally transversely in the vehicle, wherein a portion of the inner back panel is spaced apart from the outer back panel so as to define a cavity in which the window is disposed, the inner back panel having a connecting flange extending towards the side member and into a connecting flange edge; and the connecting flange edge is joined to the connecting wall edge so as to form a joined edge, the joined edge extending generally vertically, a portion of both the connecting flange and connecting wall overlap with the inner flange, and the joined edge is fixed to the side member edge to define a longitudinally extending seal, a first weld provided between the connecting flange and the side member, the longitudinally extending seal and first weld preventing liquid from passing between the cavity and an inside region of the vehicle.

2. The body structure as set forth in claim 1, wherein the connecting flange is disposed between the connecting wall and inner flange.

3. The body structure as set forth in claim 1, wherein the inner back panel includes a center wall and a side portion that extends between the center wall and the connecting flange, and wherein the outer back panel includes a middle wall spaced apart from the center wall so as to define the cavity.

4. The body structure as set forth in claim 3, wherein the side portion is substantially orthogonal to both the center wall and the connecting flange.

5. The body structure as set forth in claim 1, wherein the outer back panel includes a side edge that extends between the middle wall and the connecting wall.

6. The body structure as set forth in claim 5, where the side edge is substantially orthogonal to both the middle wall and the connecting wall.

* * * * *